United States Patent
Filsfils et al.

(10) Patent No.: US 9,369,387 B2
(45) Date of Patent: Jun. 14, 2016

(54) SEGMENT ROUTING BASED WIDE AREA NETWORK ORCHESTRATION IN A NETWORK ENVIRONMENT

(71) Applicant: CISCO TECHNOLOGY, INC., San Jose, CA (US)

(72) Inventors: Clarence Filsfils, Brussels (BE); Thomas F. Telkamp, Utrecht (NL); Alan Thornton Gous, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 141 days.

(21) Appl. No.: 14/244,502

(22) Filed: Apr. 3, 2014

(65) Prior Publication Data

US 2015/0117203 A1   Apr. 30, 2015

Related U.S. Application Data

(60) Provisional application No. 61/895,196, filed on Oct. 24, 2013.

(51) Int. Cl.
*H04L 1/00* (2006.01)
*H04L 12/803* (2013.01)

(52) U.S. Cl.
CPC .................... *H04L 47/122* (2013.01)

(58) Field of Classification Search
CPC ................ H04J 3/14; H04J 3/15; H04J 3/16; H04J 3/17; H04J 3/18; H04L 1/243; H04L 1/244; H04L 1/245; H04L 1/246; H04L 47/10; H04L 47/11; H04L 47/12; H04L 47/13
USPC .............. 370/248, 266.2, 249, 241, 231, 230, 370/252, 400, 522; 709/223, 224, 227, 228
See application file for complete search history.

(56) References Cited

U.S. PATENT DOCUMENTS

| 8,254,272 | B1* | 8/2012 | Vasseur ............... H04L 41/0677 370/236.2 |
| 2010/0265943 | A1 | 10/2010 | Dong et al. |
| 2012/0076014 | A1* | 3/2012 | Bragg ..................... H04L 45/18 370/252 |

OTHER PUBLICATIONS

Farrel, "Path Computation Element," Presentation, 11th Annual International Conference on Next Generation Internet and Related Technologies MPLS 2008 (Oct. 19-22, 2008), Washington, DC; 57 pages.

(Continued)

*Primary Examiner* — Dady Chery
(74) *Attorney, Agent, or Firm* — Patent Capital Group

(57) ABSTRACT

An example method for segment routing based wide area network (WAN) orchestration in a network environment is provided and includes monitoring a segment routing (SR) enabled WAN environment in at least near real-time by a path computation element (PCE) located outside the WAN, receiving an event notification at the PCE, and performing traffic engineering using SR to reroute traffic off shortest paths. In one embodiment, where a current state of the WAN is not pre-computed, performing traffic engineering comprises optimizing routes to remove violation of any utilization policies, deploying the optimized routes in the WAN, re-optimizing routes for other parameters, and further deploying the re-optimized routes in the WAN. In another embodiment, performing traffic engineering comprises optimizing routes to remove violation of any utilization policies and for other parameters, and deploying the optimized routes in the WAN. In another embodiment, performing traffic engineering comprises deploying optimized routes in the WAN.

17 Claims, 5 Drawing Sheets

(56) References Cited

OTHER PUBLICATIONS

Farrel, et al., "A Path Computation Element (PCE)-Based Architecture," Network Working Group RFC4655, Aug. 2006, 40 pages; http://tools.ietf.org/html/rfc4655.

Metaswitch Networks, White Paper, "PCE—An Evolutionary Approach to SDN," © 2010 Metaswitch Networks., 21 pages; http://www.metaswitch.com/sites/default/files/metaswitch-white-paper-pce-an-evolutionary-approach-to-sdn.pdf.

Previdi, et al., "Segment Routing with IS-IS Routing Protocol," IETF Draft previdi-filsfils-isis-segment-routing-02, Mar. 20, 2013, 27 pages; http://tools.ietf.org/pdf/draft-previdi-filsfils-isis-segment-routing-02.pdf.

\* cited by examiner

US 9,369,387 B2

SEGMENT ROUTING BASED WIDE AREA NETWORK ORCHESTRATION IN A NETWORK ENVIRONMENT

PRIORITY DATA

This application claims priority to Provisional Patent Application Ser. No. 61/895,196, filed Oct. 24, 2013 and entitled "SR-BASED WAN ORCHESTRATION", which is hereby incorporated by reference in its entirety.

TECHNICAL FIELD

This disclosure relates in general to the field of communications and, more particularly, to segment routing based wide area network (WAN) orchestration in a network environment.

BACKGROUND

Internet Traffic Engineering deals with performance evaluation and performance optimization of operational Internet Protocol (IP) networks. In particular, traffic engineering involves measurement, characterization, modeling, and control of network traffic. Enhancing the performance of the operational network, at both traffic and resource levels, can be accomplished by addressing traffic performance requirements, and utilizing network economically and reliably. Traffic oriented performance include packet transfer delay, packet delay variation, packet loss, and throughput, among other parameters. Reliable operations can be facilitated by providing mechanisms that facilitate network integrity and by embracing policies emphasizing survivability, resulting in a potential minimization of the network to service outages arising from errors, faults, and failures occurring within the network infrastructure.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for segment routing based WAN orchestration in a network environment is provided and includes monitoring a segment routing (SR) enabled WAN environment in at least near real-time by a path computation element (PCE) located outside the WAN, receiving an event notification at the PCE, and performing traffic engineering using SR to reroute traffic off shortest paths. In one embodiment, where a current state of the WAN is not pre-computed, performing traffic engineering comprises optimizing routes to remove violation of any utilization policies, deploying the optimized routes in the WAN, re-optimizing routes for other parameters, and further deploying the re-optimized routes in the WAN. In another embodiment, performing traffic engineering comprises optimizing routes to remove violation of any utilization policies and for other parameters, and deploying the optimized routes in the WAN. In another embodiment, performing traffic engineering comprises deploying the optimized routes in the WAN if the current state has been pre-computed.

Example Embodiments

Figure 1:
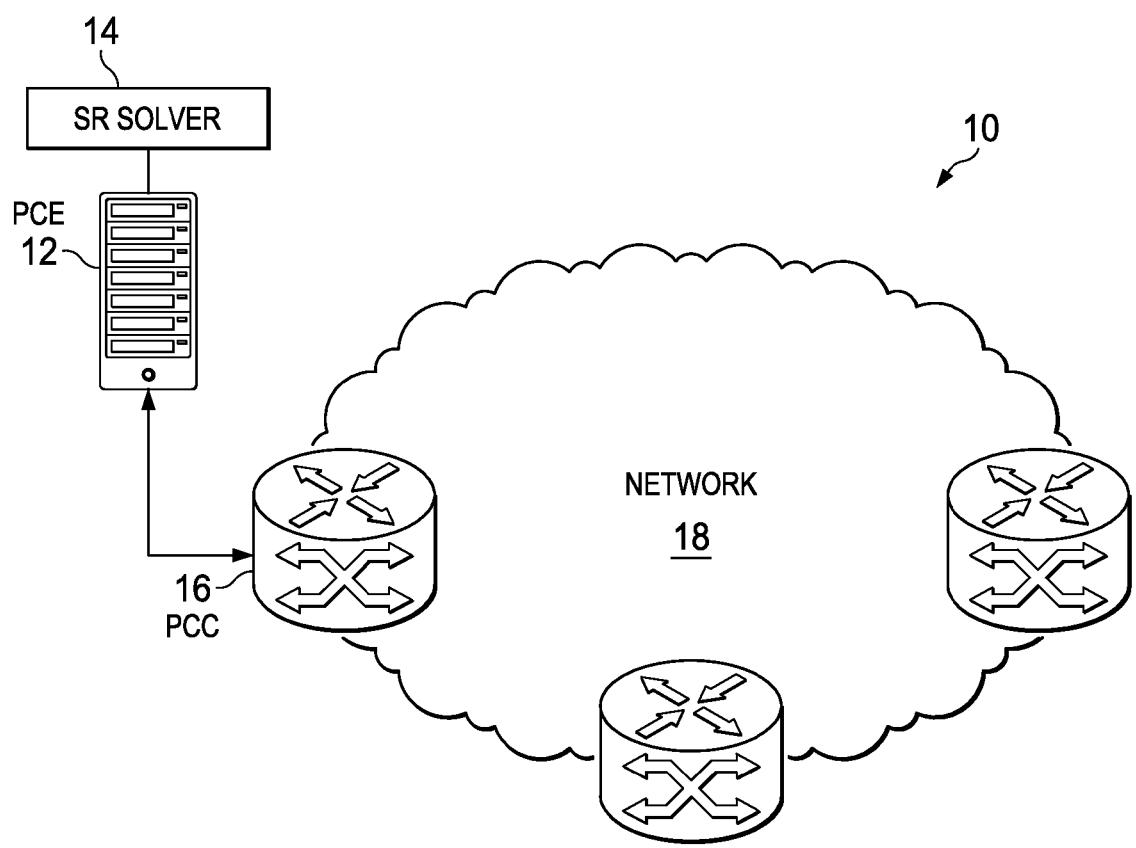
FIG. 1 is a simplified block diagram illustrating a communication system for segment routing based WAN orchestration in a network environment.

Turning to FIG. 1, FIG. 1 is a simplified block diagram illustrating a communication system 10 for adapting PIE algorithm for varying network conditions in a network environment in accordance with one example embodiment. FIG. 1 illustrates a Path Computation Engine (PCE) 12 coupled to a Segment Routing (SR) solver 14. PCE 12 communicates with a Path Computation Client (PCC) 16, located at a head end of a WAN 18. Embodiments of communication system 10 may combine SR and WAN orchestration in WAN 18 providing for substantially full leverage of equal-cost-multi-path (ECMP) nature of Internet Protocol (IP) and SR.

As used herein, the "PCE" comprises a network element (e.g., component, application, or network node) capable of computing a network path based on a network graph and applying computational constraints for conveying data between a source and a destination in a network. As used herein, the term "network element" is meant to encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

State-of-the-art for WAN orchestration is based on circuit optimization and workflow (e.g., technologies similar to Asynchronous Transfer Mode (ATM) and Frame Relay (FR), such as Resource Reservation Protocol—Traffic Engineering (RSVP-TE)). While better than nothing, the WAN orchestration processes are not optimum for IP networks because the ECMP nature of IP is not leveraged. For example, ATM/FR based WAN orchestration can lead to multiplication of Resource Reservation Protocol—Traffic Engineering tunnels to split the traffic among ECMP paths, potentially causing load-share problems, increased state maintenance at midpoints, increased signaling overhead; decreased convergence/re-optimization performance, and increased operational complexity.

SR enables any node in a network to select any suitable path for each of its traffic classes. The path does not depend on a hop-by-hop signaling technique; the path only depends on a set of segments that are advertised (e.g., by IS-IS routing protocol) to other nodes in the network. The segments act as topological sub-paths that can be combined together to form the desired path. There are two forms of segments: node segment (e.g., represents a path to a node) and adjacency segment (e.g., represents a specific adjacency to a node). The node segment is typically a multi-hop path while the adjacency segment is a one-hop path. Node segments are globally unique within the network domain.

SR uses a header per segment to route a demand from source to destination. The overall goal can be to minimize the amount of routes/traffic that require more than one segment (=destination), while meeting desired objectives, such as maximum link utilization, delay, diversity, etc. Without using multiple segments, SR routing is equivalent to native IP and LDP routing. (In a general sense, routing includes a process of selecting best paths (e.g., a path comprises a series of links connecting a sequence of network nodes) in a network.) Traffic follows the shortest path between source and destination, allowing for ECMP.

ECMP refers to a routing strategy (according to IEEE standard 802.1Qbp) where next-hop packet forwarding to a single destination can occur over multiple "best paths" that tie for top place in routing metric calculations. Multipath routing can be used in conjunction with most routing protocols, with a per-hop decision that is limited to a single router. ECMP applies a set of standard functions (e.g., hash functions) per frame at ingress, using the result as an input to all subsequent choices among multiple next hops as the frame transits the network. The functions are selected to ensure that frames belonging to the same data flow take the same path; frames belonging to other flows can take other paths.

Turning back to SR, SR is applicable to capacity planning and traffic engineering. In a general sense, capacity planning deals with anticipating placement of the traffic matrix (e.g., demand matrix) onto the network topology, for a set of expected traffic and topology variations. The heart of the process simulates placement of the traffic along ECMP-aware shortest-path and accounting for the resulting bandwidth usage. Classic Capacity Planning process consists of: collecting the topology and constructing a demand matrix; determining failure sets to plan for (e.g., link, node, fiber, shared risk link groups (SRLG), etc. failures); simulating all failures; and upgrading links to obtain appropriate utilization for any failure under a specific threshold.

In addition, Interior Gateway Protocol (IGP) (e.g., open shortest path first (OSPF) or Intermediate System to Intermediate System (ISIS)) metrics of the network can be optimized, for example, to make efficient use of available capacity within predefined constraints (e.g. end-to-end delay). The IGP metrics can be calculated to minimize maximum link utilization in a normal scenario, and under any failures, and/or to facilitate as many links as possible having a utilization lower than a specified threshold. Typically, the process is an offline Traffic Engineering method that modifies the IGP metrics on the network only at long intervals.

When the capacity planning process detects that a traffic or topology variation would lead to congestion, traffic engineering or capacity increase is triggered. A traffic engineering option includes finding a smallest set of demands that can be routed off their shortest path to eliminate congestion, then computing an explicit path for each of them and instantiating traffic-engineered policies in the network. SR offers a simple support for explicit path policy as it supports ECMP-based shortest-path placement. For example, a single node segment can enumerate all the ECMP paths along the shortest-path. In addition, adjacency segments allow expression of any explicit path. The combination of node and adjacency segment allows an expression for any path without having to enumerate all the ECMP path options.

In typical capacity planning process, the majority of the traffic rides on destination node segments (ECMP-based shortest path) while a minority of the traffic is routed off its shortest-path. IGP metric optimization can be used on an SR enabled network to force as much traffic and/or many routes as possible on the shortest path, such that no additional labels/headers are required. SR can then be used to traffic engineer specific routes off the shortest path to meet utilization requirements, delay bounds, or any other objective that could not be met by only tuning IGP metrics.

Traffic engineering in Multi-protocol Label Switching (MPLS) (or Generalized MPLS (GMPLS)) networks implements constraint-based path computation (e.g., routing subject to a set of constraints, such as Quality of Service (QoS), policy, price, etc.). Constraint-based path computation can determine the path to be taken by specific traffic and provide a route for each Label Switched Path (LSP) in the network. Path computation in large, multi-domain networks may be very complex and may require special computational components and cooperation between the different network domains. The PCE is capable of computing paths for one or more services in the MPLS (or GMPLS) network. For example, the PCE can compute the path of a traffic engineered LSP by considering bandwidth and other constraints applicable to the LSP service request. Typically, the path computed by the PCE may be an explicit path (e.g., full path from start to destination, made of a list of strict hops) or a strict/loose path (e.g., a mix of strict and loose hops comprising at least one loose hop representing the destination).

In a general sense, PCE is sometimes used as a centralized computation model for MPLS networks, including WANs such as Internet backbones. The WAN covers a broad area (i.e., any telecommunications network that links across metropolitan, regional, or national boundaries) using private or public network transports. The WAN can span regions, countries, or even the world. In such implementations, the PCE communicates with a PCC application executing on a network node (e.g., router at a head-end of the WAN) using a PCE protocol (PCEP). Generally, each network node runs a PCC, which allows it to send path computation requests to a PCE Server. The PCCs and PCE Servers communicate using the PCEP. On request by a PCC, the PCE Server computes an optimal path and returns it in the form of an Explicit RouteObject. The PCE model is thus optimized for use with MPLS-TE. The PCE leverages existing MPLS equipment and technology by migrating only the path computation component to a centralized role.

WAN Orchestration, also known as stateful PCE, monitors network topology and traffic, and orchestrates the routing policy such as to maintain a set of service level agreement (SLA) objectives (e.g., maximum utilization per link, per class, etc.). Stateful PCE provides for strict synchronization between the PCE, the network states (in term of topology and resource information), and a set of computed paths and reserved resources in use in the network. Stateful PCEs require reliable state synchronization mechanisms, with potentially significant control plane overhead and the maintenance of a large amount of data/states (for example, full mesh of TE LSPs). Typically, the PCE has the computing power and scalability to store and manipulate the large volume of information. Service providers seek to find a network traffic engineering solution that can use stateful PCE in a SR enabled network.

Communication system 10 is configured to offer a system and method for segment routing based WAN orchestration in a network environment. Combining SR and WAN orchestration provides for substantially full leverage of ECMP nature of IP/SR. In addition, fewer SR tunnels may be required, potentially leading to naturally load-shared traffic along the ECMP paths. In addition, fewer tunnels could mean less state, no signaling with better convergence and much simpler operation.

Embodiments of communication system 10 may monitor SR enabled WAN 18 in at least near real-time by PCE 12 located outside WAN 18, and upon receiving an event notification (e.g., "event" comprises any change in network topology or network traffic, or time-based traffic prediction (e.g., forecasting) of network changes; the event may be network initiated or PCE initiated) at PCE 12, perform traffic engineering (e.g., teletraffic engineering, traffic management) at SR solver 14 using SR to reroute traffic off shortest paths. PCE 12 may be configured to optimize network routing to meet the operator's policies/objectives (e.g., SLA policies). As used herein, the term "traffic engineering" comprises using statistics including queuing theory, nature of network traffic, practical models of network traffic, measurements, and simulations of network traffic, etc. to make predictions and to plan network orchestration. It includes optimizing performance of the network by dynamically analyzing, predicting, and regulating behavior of data transmitted over the network. The monitoring may be performed in real time or near real time (e.g., after predetermined time intervals, such as every X time intervals, etc.)

A high-level process loop (e.g., in real-time or every X minutes) may comprise discovering the current topology and traffic; optionally applying short-term growth (e.g., forecasting); verifying utilization policies (e.g., per class, per link, etc.); performing traffic engineering if needed; and pushing computed changes to WAN 18. Performing traffic engineering can comprise removing existing traffic engineering optimization, if needed (e.g., thereby reverting back to the shortest path routing if failures have recovered or traffic has decreased). Some of the event responses can also be pre-calculated, wherein PCE 12 can directly (e.g., without computing changes) push out the pre-computed changes on occurrence of the event.

In specific embodiments, performing traffic engineering comprises route optimization including minimizing a maximum violation of a preconfigured policy, minimizing a total number of policy violations, minimizing an amount of traffic off shortest IGP path, minimizing amount of state created, limiting a number of segments used in the rerouting, setting a delay bound per demand, maximizing survivability, and distributing traffic using ECM P. In some embodiments, the optimization may be differentiated by Quality of Service (QoS) classes.

According to various embodiments, a computation time for optimizing placement of SR tunnels may be estimated, and a specific solver (e.g., application, module, algorithm, sequence of operations, etc.) chosen for performing traffic engineering from a plurality of solvers based on the computation time. One example solver may perform traffic engineering by optimizing routes to remove violation of any utilization policies, deploying the optimized routes in the WAN, re-optimizing routes for parameters other than the violation removal, and further deploying the re-optimized routes in the WAN. Another example solver may perform traffic engineering by optimizing routes to remove violation of any utilization policies and for parameters other than the violation removal, and deploying the optimized routes in the WAN.

Yet another example solver may perform traffic engineering by determining if a current state of the WAN has been pre-computed, if the current state of the WAN has not been pre-computed, optimizing routes to remove violation of any utilization policies and for parameters other than the violation removal, deploying the optimized routes in the WAN and pre-computing additional failure scenarios, and clearance of the failure scenarios. If the current state of the WAN has been pre-computed, the operations may step to deploying the optimized routes in the WAN using the pre-computed state.

PCE 12 may compute alternate paths in case of failures, and configure the PCCs (e.g., 16) in network 18 with the computed paths, and the associated failures. PCC 16 may switch to a pre-defined path on detecting such failure. Alternatively, two paths (e.g., primary and secondary) can be configured at each PCC 16, with one of the paths (e.g., secondary) be optimized to deal with any failure on the primary path. In various embodiments, a list of failures that would trigger the router to the optimized path may be configured at PCE 12. In case of a failure, PCC 16 may perform the move from the failed path to the optimized path (and vice versa), without involvement of an external system (e.g., network troubleshooting). In some embodiments, in-between occurrence of the failure and the move to the second path, fast re-route (FRR) can be used to route around the failure.

In some embodiments, SR solver 14 may be configured to support up/down status on tunnel head-ends (e.g., PCC 16). SR solver 14 may also be configured with a mechanism for tunnel selection (e.g., using priorities) listing failure scenarios that would take a head-end down. Note that SR WAN 18 can converge after a failure, because the segments are still shortest path first (SPF) as long as the node of a nodal segment is not unreachable. After FRR, connectivity can return to normal (e.g., pre-failure) routing again. PCE 12 can simulate such state and capture the failure scenarios accordingly.

In various embodiments, PCE 12 may discover network topology and traffic prior to performing the traffic engineering. PCE 12 may gain knowledge of the topology of network 18 by participating in OSPF or ISIS routing protocols in all routing areas within network 18. The topology information could also be obtained in some other way, for example, it could be provided by a management system.

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), virtual LANs (VLANs), metropolitan area networks (MANs), WANs, VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In some embodiments, PCE 12 may comprise a network node, network management station, or dedicated computational platform that is resource-aware and has the ability to consider multiple constraints for sophisticated path computation in network 18. In other embodiments, PCE 12 can comprise an application that can be located within a network node or component, on an out-of-network server, etc. PCC 16 may comprise a client application executing in a router or other similar network element and configured to communicate with PCE 12 using suitable protocols (e.g., PCEP). In various embodiments, SR solver 14 may comprise an application running in-line with PCE 12 in a suitable server; in other embodiments, SR solver 14 may comprise a stand-alone box coupled to PCE 12 through appropriate interfaces.

Figure 2:
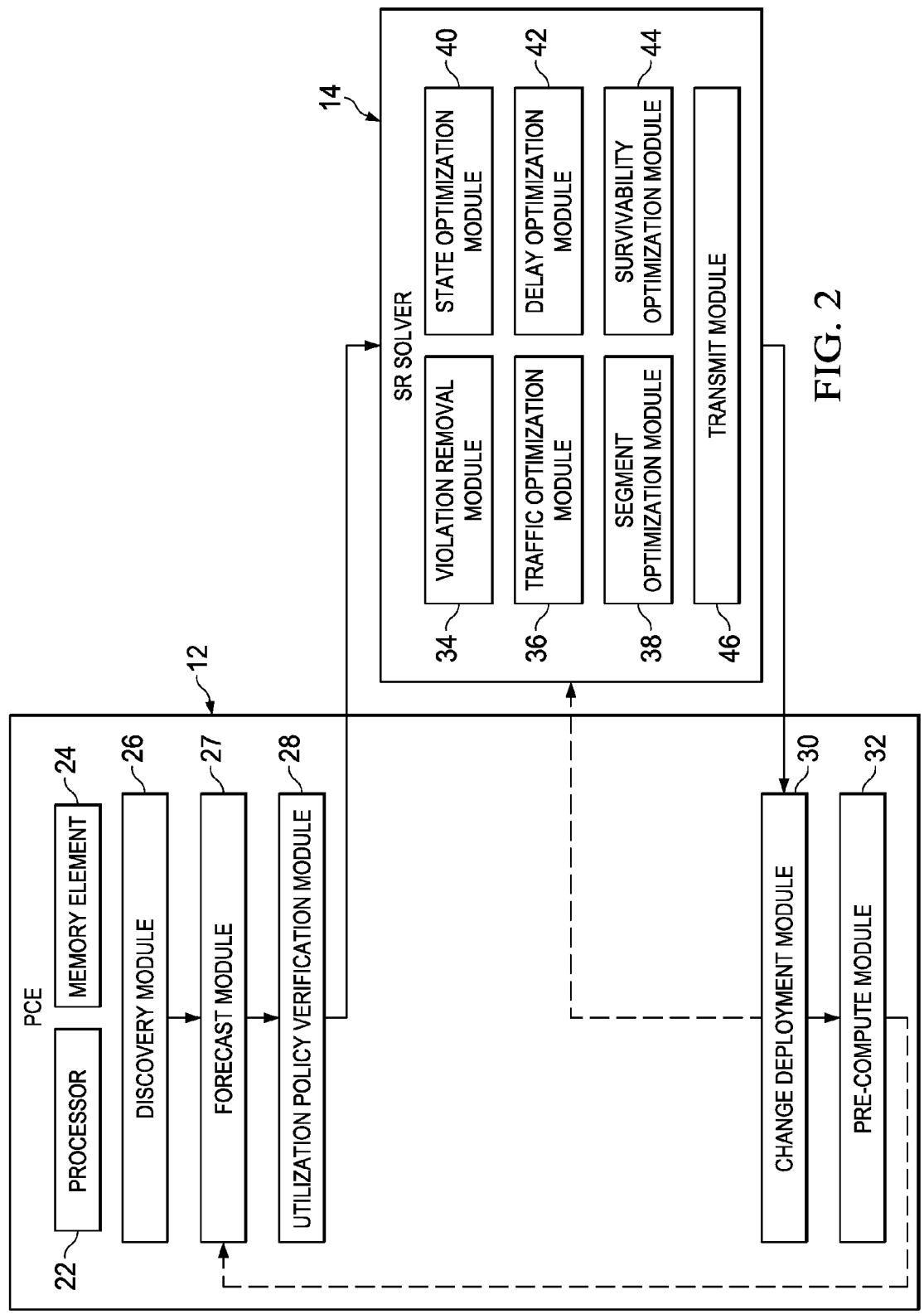
FIG. 2 is a simplified block diagram illustrating example details of an embodiment of the communication system.

Turning to FIG. 2, FIG. 2 is a simplified block diagram illustrating example details of an embodiment of communication system 10. Example PCE 12 may comprise a processor 22 and a memory element 24 for facilitating operations described herein. PCE 12 may also comprise a discovery module 26, a forecast module 28, a utilization policy verification module 29, a change deployment module 30, and a pre-compute module 32. PCE 12 may be coupled to, or communicate suitably with, SR solver 14. In various embodiments, SR solver 14 may execute in-line with PCE 12. In other embodiments, SR solver 14 may execute in an off-line planning application, and the results of SR solver 14 may be accessed by PCE 12.

During operation, discovery module 26 may facilitate discovery of network topology and network traffic. Forecast module 28 may perform short-term forecasting or prediction (e.g., based on current network state). Utilization policy verification module 29 may verify whether changes in the network topology or traffic violate pre-configured utilization policies (and other policies, for example, according to SLA). Change deployment module 30 may communicate computed changes to PCC 12 appropriately. Pre-compute module 32 may use results from SR solver 14 and predictions from forecast module 28 to pre-compute changes to routing, topology, or traffic, as appropriate.

SR solver 14 may comprise a violation removal module 34, a traffic optimization module 36, a segment optimization module 38, a state optimization module 40, a delay optimization module 42, a survivability optimization module 44, and a transmit module 46 (among other modules and/or components). Violation removal module 34 may compute a routing change that seeks to remove (e.g., reduce, including reducing to zero) violations of the utilization policies (and other policies, as appropriate). Traffic optimization module 36 may operate to minimize the amount of traffic off the shortest IGP paths. Segment optimization module 38 may operate to minimize and limit number of segments (e.g., with a predefined maximum). State optimization module 40 may operate to minimize amount of state (e.g., traffic engineered tunnel head ends) created.

Delay optimization module 42 may generate a delay bound per demand. In some embodiments, the delay bound may be expressed as a percentage of the shortest delay path, together with a minimum and maximum. For example, the delay bound may be set to 30% above the shortest possible delay, with a minimum of 10 ms (or lower) and a maximum of 200 (or lower). Survivability optimization module 44 may operate to maximize survivability (e.g., how well will network 18 can deal with future events, either up or down, using the current routing, if PCE 12 is not functional). In some embodiments, the routing may be optimized for one failure deeper than the current state (e.g., to deal with additional failures as well). In various embodiments, any of the optimization objectives, as described herein, may be differentiated by Quality of Service (QoS) class. Transmit module 46 may facilitate distributing traffic using ECMP. Substantially all modules 34-46 may be ECMP-aware, and can perform their functions while using ECMP.

In currently existing solvers, excess traffic may be placed in non-ECMP circuits with explicit routes, for example, to fit an ATM/FR/transport context. In contrast, SR solver 14 may pick excess traffic and place them on ECMP-aware SR-based explicit tunnels. Combining SR and WAN orchestration can provide for substantially full leverage of the ECMP nature in most embodiments. In addition, much fewer tunnels may be required. The fewer tunnels naturally load-share traffic along the ECMP paths. Fewer tunnels can also mean less state, no signaling [hence, better convergence], and a much simpler operation.

Figure 3:
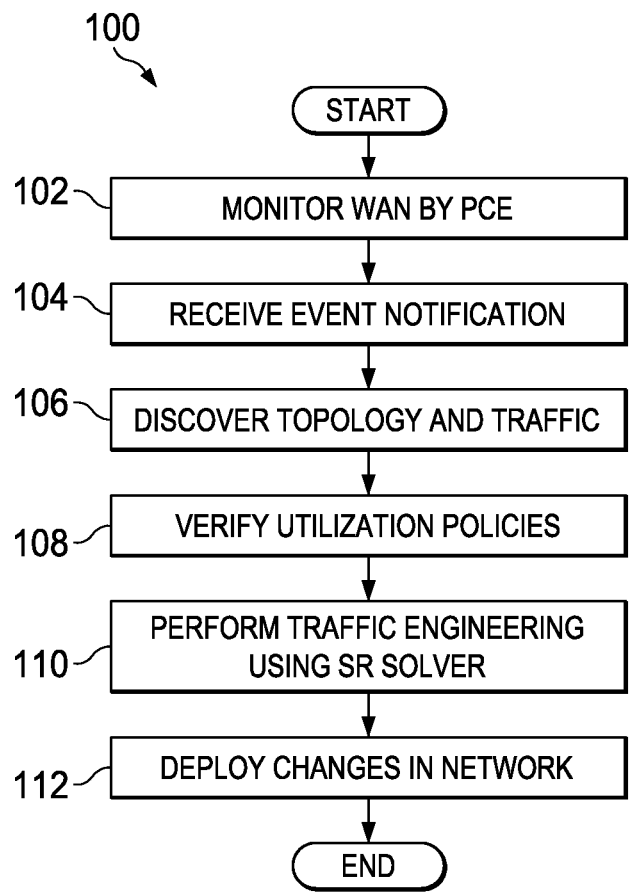
FIG. 3 is a simplified flow diagram illustrating example operations that may be associated with an embodiment of the communication system.

Turning to FIG. 3, FIG. 3 is a simplified flow diagram illustrating example operations 100 that may be associated with PCE 12 according to some embodiments of communication system 10. At 102, WAN 18 may be monitored by PCE 12. At 104, PCE 12 may receive an event notification (e.g., from PCC 16, using BGP-LS messages). At 106, PCE 12 may discover topology and traffic in WAN 18. At 108, PCE 12 may verify pre-configured utilization policies. At 110, PCE 12 may perform traffic engineering using SR solver 14. At 112, PCE 12 may deploy changes (according to the traffic engineered routing) in WAN 18.

Figure 4:
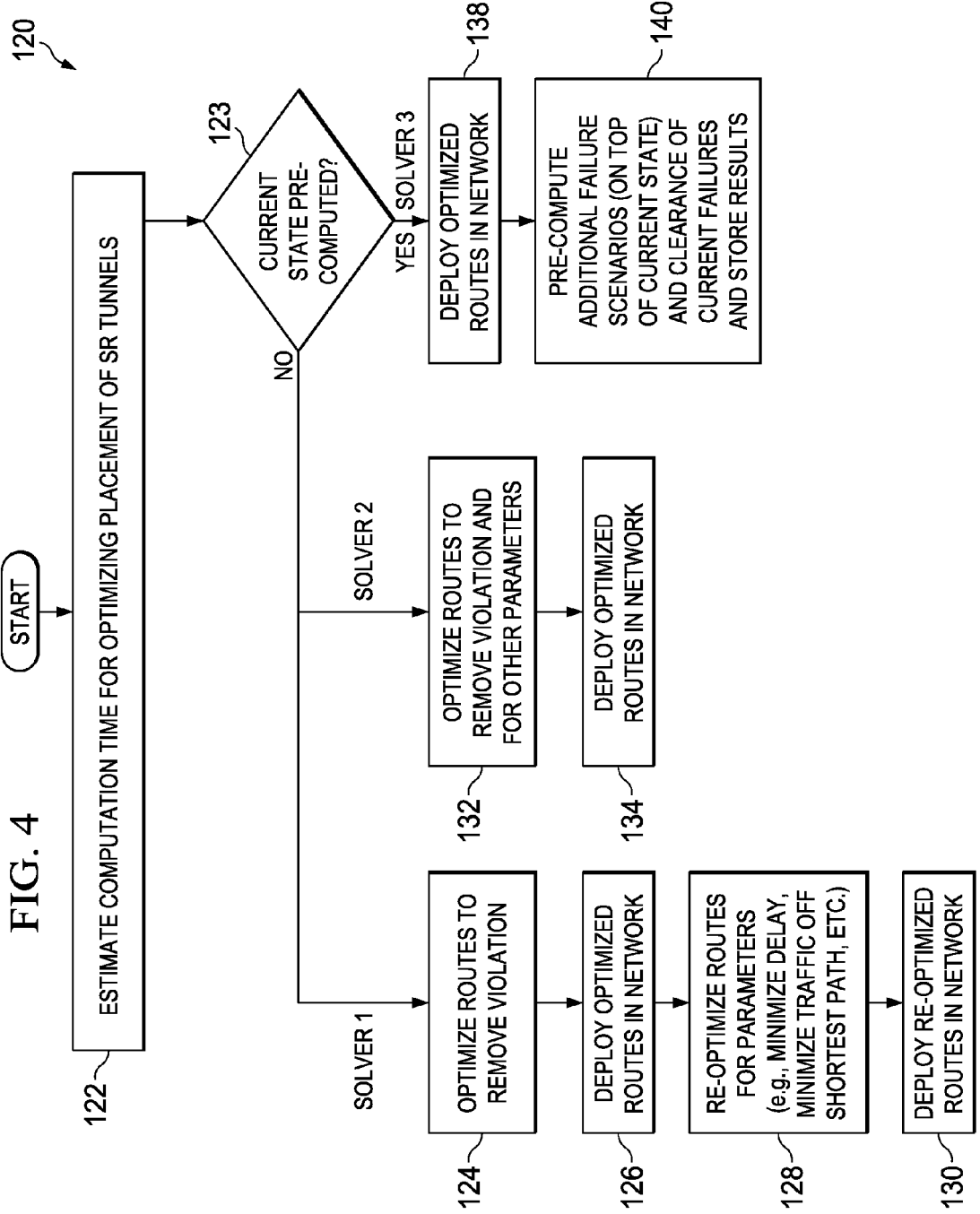
FIG. 4 is a simplified flow diagram illustrating other example operations that may be associated with an embodiment of the communication system.

Turning to FIG. 4, FIG. 4 is a simplified flow diagram illustrating example operations 120 that may be associated with SR solver 14 according to some embodiments of communication system 10. At 122, SR solver 14 may estimate a computation time for optimizing placement of SR tunnels in WAN 18. At 123, a determination may be made whether the current state has been pre-computed. If the current state has not been pre-computed, solver 1 or solver 2 may be chosen, for example, based on the computation time; otherwise, solver 3 may be chosen. In some embodiments, if the computation time is estimated to be more than a preconfigured threshold (and the current state has not been pre-computed), solver 1 may be chosen. On the other hand if the computation time is estimated to be less than the preconfigured threshold (and the current state has not been pre-computed), solver 1 may be chosen.

According to solver 1, at 124, routes may be optimized to remove violation (e.g., of any utilization policies). At 126, optimized routes may be deployed in WAN 18. At 128, routes may be re-optimized for other parameters (e.g., minimize delay, minimize traffic off shortest paths, etc.) At 130, the re-optimized routes may be deployed in WAN 18. According to solver 2, at 132, the routes may be to remove violation (e.g., of any utilization policies) and for other parameters (e.g., minimize delay, minimize traffic off shortest paths, etc.) At 134, the optimized routes may be deployed in WAN 18. According to solver 3, at 138, the optimized routes may be deployed in WAN 18. At 140, additional failure scenarios (e.g., on top of current state) and clearance of current failures may be computed, and the results stored appropriately.

Figure 5:
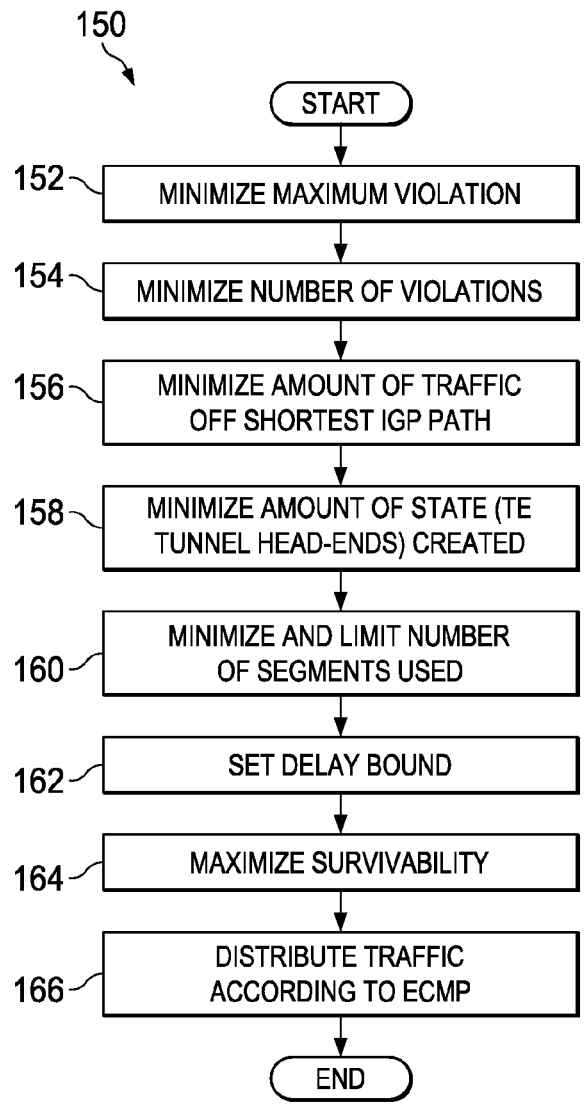
FIG. 5 is a simplified flow diagram illustrating yet other example operations that may be associated with an embodiment of the communication system.

Turning to FIG. 5, FIG. 5 is a simplified flow diagram illustrating example operations 150 that may be associated with performing traffic engineering by SR solver 14 according to some embodiments of communication system 10. At 152, maximum violations may be minimized. At 154, the number of violations may be minimized. At 156, the amount of traffic off shortest IGP paths may be minimized. At 158, the amount of state (e.g., traffic engineered tunnel head ends) created may be minimized. At 160, the number of segments may be minimized and limited to less than a preconfigured maximum. At 162, the delay bound may be set. At 164, survivability may be maximized. At 166, traffic may be distributed along appropriate routes. Note that substantially all steps may be ECMP aware.

Figure 6:
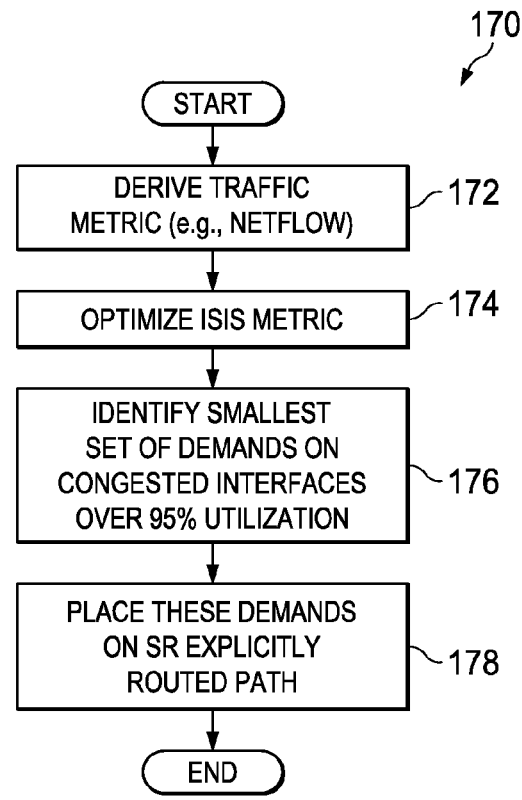
FIG. 6 is a simplified flow diagram illustrating yet other example operations that may be associated with an embodiment of the communication system.

Turning to FIG. 6, FIG. 6 is a simplified flow diagram illustrating example operations 170 that may be associated with performing WAN orchestration by PCE 12, using SR solver 14 according to some embodiments of communication system 10. At 172, a traffic matrix (e.g., from NetFlow statistics) may be derived (e.g., from communication with PCC 16). At 174, the ISIS or OSPF metrics may be optimized (e.g., according to known methods, for example, considering parameters that can influence network performances and traffic distribution like circuit length, circuit availability, etc.). At 176, the smallest set of demands to resolve policy violations on congested interfaces with high (e.g., over 95%) utilization may be identified. At 178, these demands may be placed on SR explicitly routed paths.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, SR solver 14. In some embodiments, one or more of these features may be implemented in hardware, provided external to these elements, or consolidated in any appropriate manner to achieve the intended functionality. The various network elements (e.g., SR solver 14) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, SR solver 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 24) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 22) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    monitoring a segment routing (SR) enabled wide area network (WAN) environment in real-time by a path computation element (PCE) located outside the WAN;
    receiving an event notification at the PCE; and
    performing traffic engineering using SR to reroute traffic off shortest paths, comprising a route optimization including:
        minimizing a maximum violation of a preconfigured policy;
        minimizing a total number of policy violations;
        minimizing an amount of traffic off shortest Interior Gateway Protocol (IGP) path;
        minimizing amount of state created;
        limiting a number of segments used in the rerouting;
        setting a delay bound per demand;
        maximizing survivability; and
        distributing traffic using equal cost multi-path (ECMP).

2. The method of claim 1, wherein the optimization is differentiated by Quality of Service (QoS) classes.

3. The method of claim 1, further comprising estimating a computation time for optimizing placement of SR tunnels, wherein a specific solver is chosen for performing traffic engineering from a plurality of solvers based on the computation time and availability of a pre-computed solution.

4. The method of claim 1, wherein a current state of the WAN is not pre-computed, wherein performing traffic engineering comprises:
    optimizing routes to remove violation of any utilization policies;
    deploying the optimized routes in the WAN;
    re-optimizing routes for other parameters; and
    further deploying the re-optimized routes in the WAN.

5. The method of claim 1, wherein a current state of the WAN is not pre-computed, wherein performing traffic engineering comprises:
    optimizing routes to remove violation of any utilization policies and for other parameters; and
    deploying the optimized routes in the WAN.

6. The method of claim 1, wherein a current state of the WAN is pre-computed, wherein performing traffic engineering comprises:
    deploying the optimized routes in the WAN; and
    pre-computing additional failure scenarios, and clearance of the failure scenarios.

7. The method of claim 1, wherein the traffic engineering is performed at a SR solver executing in the PCE.

8. The method of claim 1, wherein the traffic engineering is performed at a SR solver executing in an off-line planning application, wherein the results of the SR solver are accessed by the PCE.

9. The method of claim 1, wherein the monitoring is performed after predetermined time intervals.

10. Non-transitory tangible media that includes instructions for execution, which when executed by a processor, is operable to perform operations comprising:
    monitoring a SR enabled WAN environment in at least near real-time by a PCE located outside the WAN;
    receiving an event notification at the PCE; and
    performing traffic engineering using SR to reroute traffic off shortest paths, comprising a route optimization including:
        minimizing a maximum violation of a preconfigured policy;
        minimizing a total number of policy violations;
        minimizing an amount of traffic off shortest IGP path;
        minimizing amount of state created;
        limiting a number of segments used in the rerouting;
        setting a delay bound per demand;
        maximizing survivability; and
        distributing traffic using ECMP.

11. The media of claim 10, wherein a current state of the WAN is not pre-computed, wherein performing traffic engineering comprises:
    optimizing routes to remove violation of any utilization policies;
    deploying the optimized routes in the WAN;
    re-optimizing routes for other parameters; and
    further deploying the re-optimized routes in the WAN.

12. The media of claim 10, wherein a current state of the WAN is not pre-computed, wherein performing traffic engineering comprises:
   optimizing routes to remove violation of any utilization policies and for other parameters; and
   deploying the optimized routes in the WAN.

13. The media of claim 10, wherein a current state of the WAN is pre-computed, wherein performing traffic engineering comprises:
   deploying the optimized routes in the WAN; and
   pre-computing additional failure scenarios, and clearance of the failure scenarios.

14. An apparatus, comprising:
   a PCE located outside a SR enabled WAN, wherein the PCE comprises a memory element for storing data and a processor, wherein the processor executes instructions associated with the data, wherein the processor and the memory element cooperate, such that the apparatus is configured for:
   monitoring a SR enabled WAN environment in at least near real-time by the PCE;
   receiving an event notification at the PCE; and
   performing traffic engineering using SR to reroute traffic off shortest paths, comprising a route optimization including:
      minimizing a maximum violation of a preconfigured policy;
      minimizing a total number of policy violations;
      minimizing an amount of traffic off shortest IGP path;
      minimizing amount of state created;
      limiting a number of segments used in the rerouting;
      setting a delay bound per demand;
      maximizing survivability; and
      distributing traffic using ECMP.

15. The apparatus of claim 14, wherein a current state of the WAN is not pre-computed, wherein performing traffic engineering comprises:
   optimizing routes to remove violation of any utilization policies;
   deploying the optimized routes in the WAN;
   re-optimizing routes for other parameters; and
   further deploying the re-optimized routes in the WAN.

16. The apparatus of claim 14, wherein a current state of the WAN is not pre-computed, wherein performing traffic engineering comprises:
   optimizing routes to remove violation of any utilization policies and for other parameters; and
   deploying the optimized routes in the WAN.

17. The apparatus of claim 14, wherein a current state of the WAN is pre-computed, wherein performing traffic engineering comprises:
   deploying the optimized routes in the WAN; and
   pre-computing additional failure scenarios, and clearance of the failure scenarios.

* * * * *